(12) United States Patent
Nogaret

(10) Patent No.: US 11,230,249 B2
(45) Date of Patent: Jan. 25, 2022

(54) AIR BAG ASSEMBLY WITH AN AIR BAG GUIDE AND AN INTERIOR TRIM COMPONENT AND METHOD FOR PRODUCING THE SAME

(71) Applicant: MOTHERSON INNOVATIONS COMPANY LIMITED, London (GB)

(72) Inventor: Eric Nogaret, Biesheim (FR)

(73) Assignee: MOTHERSON INNOVATIONS COMPANY LIMITED, London (GB)

( * ) Notice: Subject to any disclaimer, the term of this patent is extended or adjusted under 35 U.S.C. 154(b) by 233 days.

(21) Appl. No.: 16/252,830

(22) Filed: Jan. 21, 2019

(65) Prior Publication Data

US 2019/0225179 A1      Jul. 25, 2019

(30) Foreign Application Priority Data

Jan. 22, 2018   (EP) .................................... 18152713

(51) Int. Cl.
*B60R 21/215* (2011.01)
*B60R 21/217* (2011.01)
*B29C 45/14* (2006.01)
*B29K 23/00* (2006.01)
(Continued)

(52) U.S. Cl.
CPC .......... *B60R 21/215* (2013.01); *B60R 21/217* (2013.01); *B29C 45/14631* (2013.01); *B29K 2023/12* (2013.01); *B29L 2031/3038* (2013.01); *B60R 21/264* (2013.01); *B60R 2021/21506* (2013.01); *B60R 2021/21537* (2013.01)

(58) Field of Classification Search
CPC ......................... B60R 21/215; B60R 21/2165
See application file for complete search history.

(56) References Cited

U.S. PATENT DOCUMENTS 6,595,543 B2 *   7/2003   Desprez .............. B60R 21/2165
                                                  280/728.2
6,761,375 B2 *   7/2004   Kurachi .............. B60R 21/2165
                                                  280/728.2
(Continued)

FOREIGN PATENT DOCUMENTS

DE           10223302 A1 * 12/2003   ......... B60R 21/2165
DE    10 2005 026 712 A1    1/2007
(Continued)

OTHER PUBLICATIONS

European Search Report issued by the European Patent Office in European Patent Application 18 152713.6.

*Primary Examiner* — Nicole T Verley
(74) *Attorney, Agent, or Firm* — Ursula B. Day, Esq.

(57) ABSTRACT

An air bag guide for a motor vehicle, includes a molded component defining a guide channel with an exit opening so the air bag can exit from the guide channel. The molded component is a thermoplastic material or a thermoplastic matrix and includes an insert inserted into the molded component. A first section of the insert, connects the insert with the molded component. A second section hingedly connects to the first section that is movable and opens under the action of the air bag upon exiting the guide channel then closes the exit opening. The insert is of the same thermoplastic material as the molded component or includes the same thermoplastic matrix and is self-reinforcing at least in the second section.

14 Claims, 3 Drawing Sheets

(51) Int. Cl.
*B29L 31/30* (2006.01)
*B60R 21/264* (2006.01)

(56) References Cited

U.S. PATENT DOCUMENTS

| | | | | |
|---|---|---|---|---|
| 6,929,280 B2* | 8/2005 | Yasuda | ............... | B29C 65/06 |
| | | | | 280/728.2 |
| 7,007,970 B2* | 3/2006 | Yasuda | ............... | B29C 65/06 |
| | | | | 280/728.3 |
| 7,093,849 B2* | 8/2006 | Nishijima | ............... | B32B 27/32 |
| | | | | 280/728.3 |
| 7,178,825 B2* | 2/2007 | Fujii | ............... | B60R 21/2155 |
| | | | | 280/728.3 |
| 7,234,724 B1* | 6/2007 | Cowelchuk | ............... | B60R 21/205 |
| | | | | 280/728.2 |
| 7,234,726 B2* | 6/2007 | Trevino | ............... | B60R 21/2165 |
| | | | | 280/728.3 |
| 7,275,759 B2* | 10/2007 | Sawada | ............... | B60R 21/2155 |
| | | | | 280/728.1 |
| 7,290,790 B2* | 11/2007 | Kielinen | ............... | B60R 21/205 |
| | | | | 280/728.2 |
| 7,354,061 B2* | 4/2008 | Yasuda | ............... | B60R 21/205 |
| | | | | 280/728.3 |
| 7,422,232 B2* | 9/2008 | Cowelchuk | ............... | B60R 21/205 |
| | | | | 280/728.3 |
| 7,484,752 B2* | 2/2009 | Yasuda | ............... | B29C 65/06 |
| | | | | 280/728.3 |
| 7,658,404 B2* | 2/2010 | Sadano | ............... | B60R 21/2165 |
| | | | | 280/732 |
| 7,661,698 B2* | 2/2010 | Yamada | ............... | B60R 21/2165 |
| | | | | 280/728.3 |
| 7,740,269 B2* | 6/2010 | Kang | ............... | B60R 21/2165 |
| | | | | 280/728.3 |
| 7,806,430 B2* | 10/2010 | Cowelchuk | ............... | B60R 21/2165 |
| | | | | 280/728.3 |
| 7,934,745 B2* | 5/2011 | Hayashi | ............... | B60R 21/205 |
| | | | | 280/728.3 |
| 8,181,987 B2* | 5/2012 | Mazzocchi | ............... | B60R 21/215 |
| | | | | 280/728.3 |
| 8,336,908 B1* | 12/2012 | Kalisz | ............... | B60R 21/205 |
| | | | | 280/728.3 |
| 8,657,327 B2* | 2/2014 | Kanno | ............... | B29C 66/545 |
| | | | | 280/728.3 |
| 8,870,217 B2* | 10/2014 | Kim | ............... | B60R 21/215 |
| | | | | 280/728.3 |
| 8,944,460 B2* | 2/2015 | Mazzocchi | ............... | B60R 21/215 |
| | | | | 280/728.3 |
| 9,139,152 B2 | 9/2015 | Nogaret et al. | | |
| 9,156,428 B2* | 10/2015 | Edeline | ............... | B60K 37/00 |
| 9,321,419 B2* | 4/2016 | Kwasnik | ............... | B60R 21/2165 |
| 10,081,327 B2* | 9/2018 | Toda | ............... | B60R 21/2165 |
| 10,377,336 B2* | 8/2019 | Lu | ............... | B60R 21/2165 |
| 2002/0014759 A1* | 2/2002 | Desprez | ............... | B60R 21/2165 |
| | | | | 280/728.3 |
| 2006/0022438 A1* | 2/2006 | Beckley | ............... | B60R 21/215 |
| | | | | 280/728.3 |
| 2006/0033313 A1* | 2/2006 | Horiyama | ............... | B29C 65/0618 |
| | | | | 280/728.3 |
| 2007/0029763 A1* | 2/2007 | Hayashi | ............... | B29C 66/532 |
| | | | | 280/728.3 |
| 2009/0134608 A1* | 5/2009 | Kang | ............... | B60R 21/2165 |
| | | | | 280/728.3 |
| 2014/0375025 A1* | 12/2014 | Pauthier | ............... | B60R 21/216 |
| | | | | 280/728.3 |

FOREIGN PATENT DOCUMENTS

| | | | | |
|---|---|---|---|---|
| DE | 102009034916 A1 * | 3/2011 | ......... | B60R 21/2165 |
| DE | 10 2009 058 688 A1 | 6/2011 | | |
| DE | 102010054574 A1 * | 6/2012 | ......... | B60R 21/216 |
| DE | 10 2012 112 173 A1 | 6/2013 | | |
| EP | 1700755 A2 * | 9/2006 | ......... | B60R 21/205 |
| EP | 1731381 A2 * | 12/2006 | ......... | B60R 21/205 |
| EP | 1745988 A1 * | 1/2007 | ......... | B60R 21/2165 |
| EP | 1 787 874 A1 | 5/2007 | | |
| EP | 2 703 232 A1 | 3/2014 | | |
| FR | 2927290 A1 * | 8/2009 | ......... | B60R 21/2165 |
| JP | 2017197098 A | 11/2017 | | |
| WO | WO-2007128921 A * | 11/2007 | ......... | B60R 21/2165 |
| WO | WO-2019134796 A1 * | 7/2019 | ............ | B60R 13/02 |
| WO | WO-2019179698 A1 * | 9/2019 | ............ | B60R 21/205 |

* cited by examiner

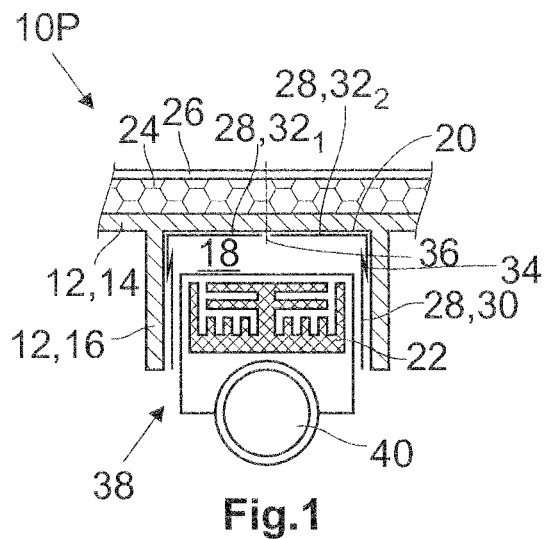
Fig.1
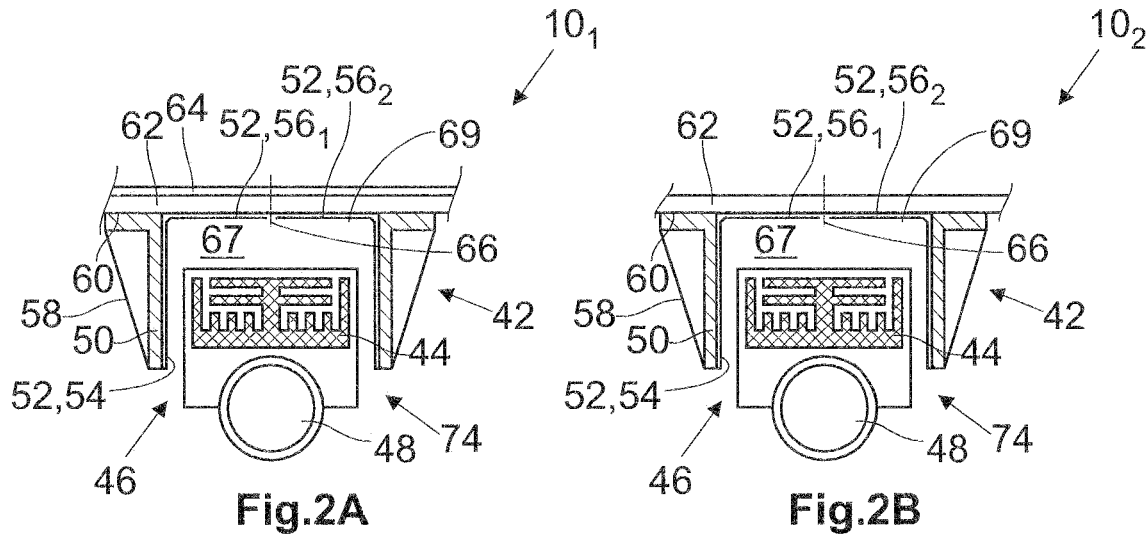
Fig.2A  Fig.2B
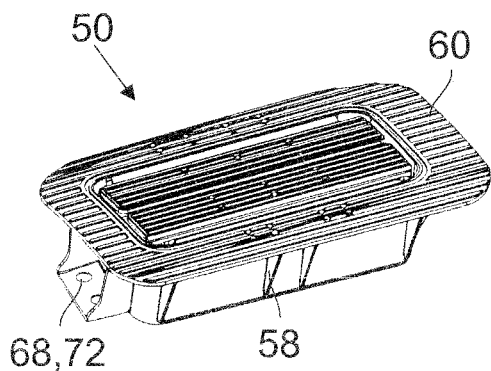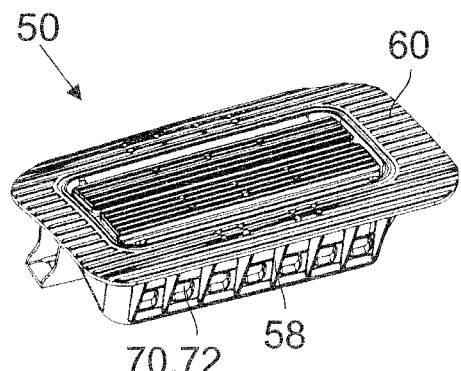
Fig.3A  Fig.3B

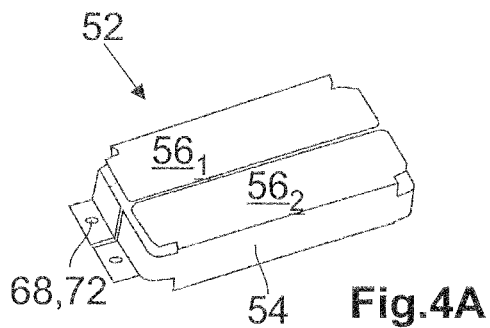 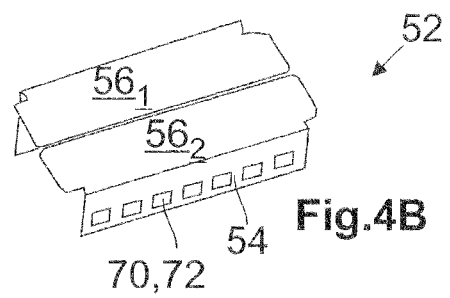
Fig.4A   Fig.4B
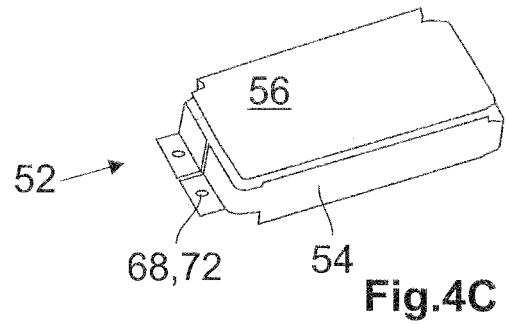 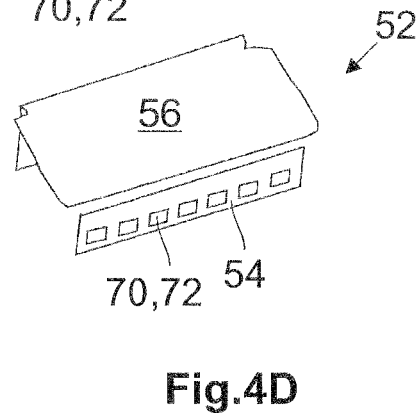
Fig.4C   Fig.4D
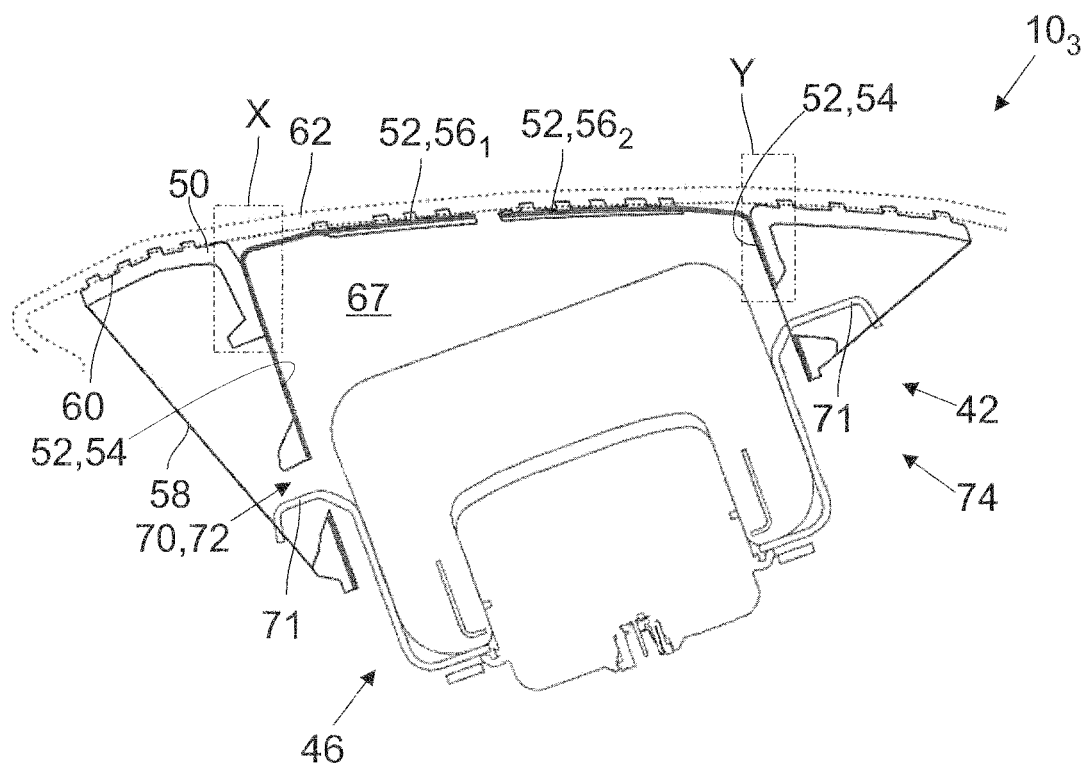
Fig.5

AIR BAG ASSEMBLY WITH AN AIR BAG GUIDE AND AN INTERIOR TRIM COMPONENT AND METHOD FOR PRODUCING THE SAME

CROSS-REFERENCES TO RELATED APPLICATIONS

This application claims the priority of European Patent Application Serial No. EP 18 152713.6, filed Jan. 22, 2018 the subject matter of which is incorporated herein by reference

BACKGROUND OF THE INVENTION

The present invention relates to an air bag guide for guiding an air bag of a motor vehicle. Furthermore, the invention relates to an air bag assembly with such an air bag guide and an interior trim component, comprising such air bag guide. Furthermore, the invention relates to a method for producing an interior trim component.

Air bags have proven to be an effective tool for occupant protection in the event of impact of a motor vehicle, which is why the number of air bags installed in modern motor vehicles is steadily increasing in order to effectively protect the vehicle occupants not only in frontal impacts, but also in side impacts and rollovers.

In the event of an impact or rollover, the air bag is inflated by a gas generator. The air bag and the gas generator are typically combined to form an air bag module in which the air bag is arranged folded in the deflated state.

To enable air bags to effectively develop their protective effect in the event of an impact or rollover, it is very important that the air bag can be inflated in a predictable manner. To this end, the air bag module is provided with a guide channel, also referred to as a firing channel which guides the air bag during inflation in a defined manner.

Nothing in the following discussion of the state of the art is to be construed as an admission of prior art.

It is clear from these accounts that a relatively complex air bag assembly is necessary in order to be able to ensure proper functioning of the air bag. However, because the air bag assembly should only minimally affect the design of the interior space of the vehicle, the air bag assembly is arranged behind the interior trim of the motor vehicle. But the interior trim has so to be designed so that when the air bag is triggered, it can penetrate into the interior space of the vehicle without impairing its function. For this purpose, it is known to provide interior trim components with predetermined breaking points, which are opened by the inflating air bag. Interior trim components designed in this way are disclosed, for example, in DE 10 2005 026 712 A1, DE 10 2012 112 173 A1 or EP 2 703 232 A1.

In many cases, the interior trim components are injection-molded or produced in a mold having a bottom mold and a top mold and can hence be demolded. If allowed by the design of the interior trim components, the air bag guides can be integrated in the interior trim components so that they can be molded with the rest of the interior trim without requiring an additional manufacturing step. If not allowed by the design of the interior trim components, separate air bag guides are used. All interior trim components disclosed in DE 10 2005 026 712 A1, DE 10 2012 112 173 A1 or EP 2 703 232 A1 have in common that the guide channels are formed by structural components, which extend more or less within the interior trim components and which are usually injection molded. The air bag modules are attached to the guide channels. To ensure that the structural components can safely accommodate the forces when the air bag is deployed, the structural components must have a certain minimum wall thickness. In particular, material accumulates where wall sections abut, causing sink marks in the injection molded parts. For example, these sink marks do not represent a disadvantage for the interior trim components disclosed in the EP 2 703 232 A1 because the structural components have a three-layer structure and are provided with a relatively thick foam layer. However, such foam layers are relatively expensive and are therefore used only in upscale vehicles.

Instead of the foamed covers, laminated or sprayed carrier components can be used, which is applied directly to the structural components, as described for example in DE 10 2005 026 712 A1. Less expensive support components have the disadvantage compared with foamed covers that the sink marks cause imperfections that are visible from interior space. Since molded parts can become brittle over time due to the seepage of plasticizers in the injection molding material, cracks and other optically adverse changes can develop at the imperfections.

SUMMARY OF THE INVENTION

According to one aspect of the present invention an improved embodiment of the present invention to provide an interior trim component is proposed, with which the above-described situation can be alleviated and with which it is in particular possible to avoid the described sink marks and to thus provide a visually appealing and durable interior trim component even without resorting to foamed covers.

The present invention resolves prior art problems by providing an improved air bag guide for guiding an air bag of a motor vehicle that includes a molded component, which defines a guide channel for the air bag with an exit opening through which the air bag can exit from the guide channel, wherein the molded component is composed of a thermoplastic material or has a thermoplastic matrix, and an insert inserted in the molded component, wherein the insert includes a first section with which the insert is materially connected with the molded component, and at least one second section, which is movably connected relative to the first section by a type of hinge, and wherein the second section closes the exit opening and opens under the action of the air bag upon exiting the guide channel, and the insert is made of the same thermoplastic material as the molded component or has the same thermoplastic matrix as the molded component, and the thermoplastic material self-reinforces the thermoplastic polymer matrix at least in the second section.

In a further aspect of the present invention, an airbag assembly for a motor vehicle is provided that includes an air bag module having an air bag and a gas generator cooperating with the air bag for inflating the air bag, and an air bag guide according to any one of the preceding claims, wherein the air bag module is attached to the air bag guide.

Another aspect of the present invention includes an interior trim component for a motor vehicle that includes an air bag guide and an air bag module having an air bag and a gas generator cooperating with the air bag for inflating the air bag, wherein the air bag module is attached on the air bag guide, and a support component which is attached on the air bag guide in the region of the exit opening.

A method for producing an interior trim component is also provided; the method providing the following steps injection-molding a molded component made of a thermoplastic material or of a thermoplastic matrix, wherein the molded component defines a guide channel for the air bag with an exit opening, via which the air bag can exit from the guide channel; injection-molding an insert for inserting in the molded component made of the same thermoplastic material or of the same thermoplastic matrix, wherein the insert has a first section with which the insertion part is materially connected with the molded part, and at least a second section, which is hingedly connected to the first section and movable relative to the first section, and the second section closes the exit opening and opens under the effect of the air bag when exiting the guide channel, wherein the thermoplastic material or the thermoplastic matrix is self-reinforcing at least in the second section, and attaching a support component on the air bag guide, which is formed by the molded component and the insert, in the region of the exit opening.

Thermoplastic materials can be reversibly deformed in a certain temperature range. In particular, thermoplastic materials can be welded.

A molded component and an insert made of a thermoplastic material consist only of this thermoplastic material, whereas molded components and inserts with a thermoplastic matrix include a thermoplastic material, which serves as a matrix for other components. In this respect, the molded components and inserts in this case include other additives in addition to the actual thermoplastic material.

According to the present invention, the plastic matrix of the insert is intended to be self-reinforced at least in the second section. In order to make the plastic matrix self-reinforcing, the molecular structure and crystallinity of the plastic material can be intentionally changed. As a result, in particular the tensile strength can be increased without having to add further components. Furthermore, the self-reinforcing material can be made very tough, so that it breaks only at temperatures below −35° C. Moreover, other components can be added to the self-reinforcing plastic materials in order to selectively change certain properties.

Since the molded component and the insert have the same thermoplastic matrix or consist of the same thermoplastic material, they can be materially interconnected without great effort, especially with a corresponding design of the injection molding process.

The second section is hingedly connected to the first section. This is achieved in that the insert has a reduced wall thickness at the transition. Consequently, the insert can be bent at the transition from the first section to the second section without breaking. This is also referred to as a film hinge.

As aforestated, the prior art guide channel is formed by projections, which protrude from the base section of the structural component. Since the projections and the base section are injection-molded contiguously, material accumulates which leads to sink marks. In contrast, the molded component is a separate component, on which an interior trim component can be overmolded. Material accumulations are avoided, making it possible to provide an interior trim component with a laminated or sprayed support component without causing imperfections. As mentioned above, such support components are, unlike foamed covers, comparatively inexpensive, so that by employing interior trim components that are equipped with the proposed air bag guide, a higher quality visible surface formed of or supported by the support component without imperfections can be provided even in less expensive vehicles.

The second section of the insert moves relative to the first section upon deployment of the air bag. A reduced wall thickness of the second section has the advantage that upon opening of the exit opening caused by triggering the air bag, less mass has to be moved and therefore less inertia must be overcome. Since the air bag must inflate very fast in the event of an impact or a rollover, a reduced wall thickness supports a fast inflation of the air bag. Similarly smaller are also the recoil forces, acting in the air bag module, which must be absorbed during inflation.

Because the air bag must inflate within a very short time, it exits explosively from the exit opening, causing a risk that parts splinter from the support component or from the insert, injuring the occupants. As mentioned above, the support component can be connected with the insert. Splintering of parts is prevented despite a reduced wall thickness by providing the insert at least in the second section, which moves relative to the first section when the air bag is triggered, with the self-reinforcing plastic matrix or the self-reinforcing plastic.

In accordance with another embodiment, the thermoplastic material is polypropylene. Alternatively, the thermoplastic matrix includes polypropylene. Polypropylene is particularly suitable for the injection molding process and can be produced in various forms, especially also self-reinforcing. Since polypropylene is a very frequently used thermoplastic material, its properties are well researched, which simplifies its handling in the production of the proposed air bag guide. In addition, polypropylene has strength characteristics similar to those of metal; however, polypropylene offers the advantage of having a lower weight than metal.

In another embodiment, the molded component may be fiber-reinforced. As a result, the wall thicknesses of the molded component can be reduced without reducing the strength and in particular the tensile strength. In addition, the risk of parts splintering when the air bag is deployed is eliminated. Insertion of a fabric in the molded component should also be understood as fiber reinforcement. It is suggested to reinforce the molded component with glass fibers, polypropylene fibers, and/or carbon fibers.

In another embodiment, the molded component may have reinforcement ribs. In addition to strengthening the molded component, flange-like support surfaces can be created to which, for example, the air bag module or the support component can be attached. These support surfaces can be strengthened with the reinforcement ribs without requiring an excessive amount of additional material and thus increasing the weight too much.

In another embodiment, the molded component and/or the insert may have a number of mounting sections for attaching an air bag module. In this way, the air bag module can be easily attached to the air bag guides.

Another embodiment is characterized in that the mounting sections include screw holes via which the air bag module is attached to the air bag guide by way of a screw connection which in particular has bolts integrated in the air bag guide. Screw connections can be easily and inexpensively provided and can be easily released again if necessary, for example when an air bag module is to be replaced. The integrated bolts are provided without an additional process step in the manufacture of the air bag guide.

According to another embodiment, the mounting sections include hooking holes, via which the air bag module can be connected with the air bag guide by means of a hook connection. Hook connections can advantageously be provided without tools; however, special tools are needed for releasing the hook connections. Since air bag modules are relatively rarely replaced, this is not a significant disadvantage.

An embodiment of the invention relates to an air bag module for a motor vehicle, including an air bag module with an air bag and a gas generator cooperating with the air bag for inflating the air bag, and an air bag guide according to one of the previously disclosed embodiments, wherein the air bag module is attached to the air bag guide.

An embodiment of the invention relates to an interior trim component for a motor vehicle, including an air bag guide according to one of the previously disclosed embodiments, an air bag module having an air bag, and a gas generator cooperating with the air bag for inflating the air bag, wherein the air bag module is attached on the air bag guide, and a support component which is attached on the air bag guide in the region of the exit opening.

The technical effects and benefits that can be achieved with the proposed air bag component and the proposed interior trim component correspond to those discussed above for the present air bag guide. In summary, it should be noted that the guide channel is formed by a separate molded component, on which an interior trim component can be overmolded. Material accumulations are prevented, so that sink marks are no longer generated. Consequently, the support components can be simple and have a small wall thickness, without imperfections and other optically objectionable sites that are visible from the interior space of the vehicle. Expensive foam layer for covering the air bag module and the air bag guide are not required.

Since the support components can be made thin, no lifting loops are needed. Lifting loops have the effect that the second section is moved first somewhat along the guide channel over the free surface of the cover and beyond, and rotated only thereafter. This ensures that the second section can be opened completely without being blocked by the foamed cover. Because the support components can have a thin wall thickness, they do not block the second section at all or only to a negligible extent. However, this does not exclude lifting loops on the interior trim component, if these are deemed necessary.

The reduced wall thickness, in particular of the second section, reduces its mass and the mass inertia to be overcome, thus supporting a rapid inflation of the air bag. Furthermore, despite the reduced wail thickness, splintering of parts is prevented due to the use of the self-reinforcing plastic matrix or the self-reinforcing plastic.

According to another embodiment, the support component is injection-molded, or is injection-molded and provided with a decorative layer. A decorative layer can be provided by laminating, coating, spray-painting or flooding the support component. When the support component is laminated, a film is usually glued on the support component. The laminating agent used for this purpose may be glue, lacquer or a wax. The film can also be connected to the support component by applying heat and/or pressure, in particular when the support component and/or the film consist of or contain a thermoplastic material, in which case a lamination agent is not needed. Flooding refers to coating the support component with a layer which is in the liquid state during flooding and subsequently cures. The layer can also be foamed during curing, thereby forming the aforementioned foam layer. The interior trim component can in this embodiment be easily matched to the other design of the interior space. An appealing design of the interior space can in particular be achieved with lamination. For this purpose, only the support component needs to be adjusted accordingly. Further measures are not required. In particularly simple versions, the application of a further decorative layer can be dispensed with.

An embodiment of the invention relates to a method for producing an interior trim component, with the following steps:

Injection-molding a molded component made of a thermoplastic material or of a thermoplastic matrix, wherein the molded component defines a guide channel for the air bag with an exit opening, through which the air bag can exit from the guide channel, injection-molding an insert inserted into the molded component and made from the same thermoplastic material or the same thermoplastic matrix, wherein the insert has a first section via which the insert is materially connected with the molded component, and least a second section which is movably connected to the first section by a hinged connection, and the second section closes the exit opening and opens under the action of the air bag as it exits the guide channel, wherein the thermoplastic material or the thermoplastic matrix is self-reinforcing at least in the second section, and attaching a support component on the air bag guide, which is formed by the molded component and the insert, in the region of the exit opening, Because both the molded component and the insert have the same thermoplastic matrix or are made of the same thermoplastic material, excess material can be produced by a corresponding design of the injection-molding process. Further attachment measures are not necessary. Since a foam layer can be dispensed with, the procurement costs for the interior trim component can be reduced. Moreover, the molded component can be sprayed directly onto the air bag guide, thus making further attachment measures unnecessary. For example, injection-molding of a thermoplastic matrix having added glass fibers is not more complex than injection-molding a thermoplastic material, since the glass fibers are already included in the granules which are melted during the injection-molding process.

In another embodiment, the method includes the step of attaching to the air bag guide an air bag module having an air bag and a gas generator co-operating with the air bag for inflating the air bag. Air bag modules are delivered as finished units which hence do not necessarily have to be attached to the air bag guide immediately after completion of the interior trim component. However, it is advantageous to carry out this step immediately or shortly after completion of the air bag guide, which allows a complete unit to be delivered to the manufacturer of the motor vehicle, without the need to fasten the air bag module on the air bag guide device at the manufacturer's site.

BRIEF DESCRIPTION OF THE DRAWING

Other features and advantages of the present invention will be more readily apparent upon reading the following description of currently preferred exemplified embodiments of the invention with reference to the accompanying drawing, which show in:

FIG. 1 a schematic diagram of an interior trim component according to the prior art, FIG. 2A a schematic diagram of a first embodiment of an interior trim component according to the present invention, FIG. 2B a schematic diagram of a second embodiment of an interior trim component according to the present invention, FIG. 3A a first embodiment of a molded component according to the present invention, FIG. 3B a second embodiment of a molded component according to the present invention, each in a perspective view, FIG. 4A a first embodiment of an insert according to the present invention, FIG. 4B a second embodiment of an insert according to the present invention, FIG. 4C a third embodiment of an insert according to the present invention, FIG. 4D a fourth embodiment of an insert according to the present invention, each in a perspective view, FIG. 5 a third embodiment of an interior trim component according to the present invention, and FIG. 6 a fourth embodiment of an interior trim component according to the present invention, each in a sectional view, FIG. 7A a first embodiment of the region marked with an "X" in FIG. 5, and FIG. 7B a second embodiment of the region marked with an "X" in FIG. 5.

DETAILED DESCRIPTION OF PREFERRED EMBODIMENTS

Figure 6:
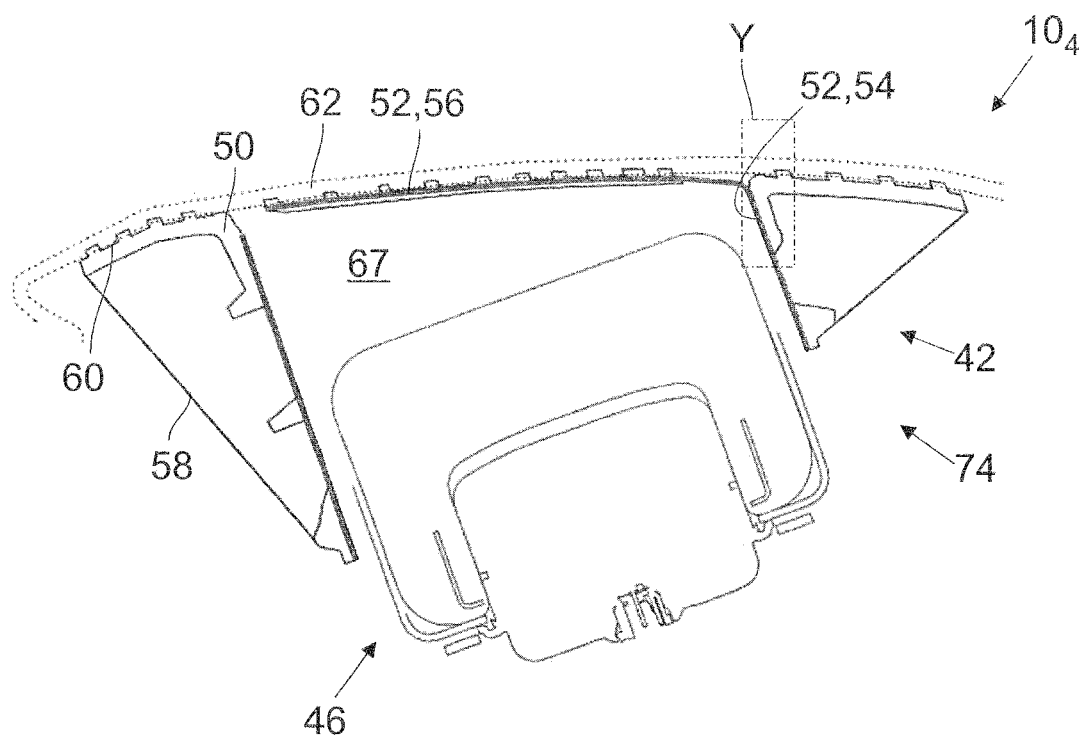

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a prior art interior trim component 10P. The interior trim component 10P includes a structural component 12 having a flat base section 14 and a tubular projection 16 which extends substantially perpendicular to the base section 14 and defines a guide channel 18 with an exit opening 20 for an air bag 22. A foam layer 24, which is provided with a decorative layer 26, is applied on the side of the tubular section 16 opposite of the base section 14. An insert 28, which has a first section 30 and two second sections $32_1$, $32_{2x}$, which are movable relative to the first section 30, is arranged in the guide channel 18. The first section 30 has a lifting loop 34. The first section 30 is connected materially with the tubular projection 16, except for the region between the lifting loop 34 and the transition to the two second sections, while the two second sections 32 are materially connected with the base section 14. The interior trim component 10P includes a tear line 36, at which the two second sections $32_1$, $32_2$ of the insert 28 meet and along which the base section 14, the foam layer 24 and the decorative layer are intentionally weakened, for example by means of a perforation. The air bag 22 is arranged in an air bag module 38, which includes a gas generator 40 cooperating with the air bag 22. The air bag module 38 is attached to the tubular projection 16 in a manner not shown in detail. The air bag 22 is arranged folded in the air bag module 38. In the event of a collision or a rollover of the motor vehicle, the gas generator 40 explosively inflates the air bag 22, causing the air bag 22 to strike the insert 28 due to the increase of its volume, thereby pushing the insert 28 upward with reference to FIG. 1. The lifting loop 34 is hereby tensioned so that the two sections $32_1$, $32_2$ are pushed out of the guide channel 18. The two second sections 32 with the base section 14, the foam layer 24 and the decorative layer disposed thereon are rotated by approximately 90° on both sides of the tear line 36 close to where the tubular projection 16 transitions into the base section 14. The exit opening 20 is thus released, allowing the air bag 22 to inflate completely.

FIG. 2A also shown as a schematic diagram is the interior trim component $10_1$ according to a first exemplary embodiment of the present invention. The proposed interior trim component $10_1$ has no structural component, but has instead an air bag guide 42 for guiding an air bag 44, which as shown to FIG. 1, is arranged folded in an air bag module 46 and in cooperation with a gas generator 48.

The air bag guide 42 includes a molded component 50 and an insert 52 inserted therein, which are composed of the same thermoplastic matrix or are made of the same thermoplastic material. In the illustrated example, the thermoplastic matrix is formed of polypropylene, or the thermoplastic material is polypropylene. The insert 52 includes a first section 54 with which the insert 52 is materially connected with the molded component 50, and two second sections $56_1$, $56_2$, which are hingedly connected with the first section 54 and are therefore movable relative to the first section 54. The thermoplastic matrix or the thermoplastic material is designed to be self-reinforcing (e.g. SRPP, self-reinforced polypropylene) at least in the two second sections $56_1$, $56_2$.

The molded component 50 is provided with reinforcing ribs 58 which support a flange-type support surface 60, by way of which the molded component 50 is connected with a support component 62. In addition, the support component 62 is connected with the two second sections 56 of the insert 52. The support component 62 can be sprayed onto the molded component 50 and the two second sections $56_1$, $56_2$, or can be applied in some other way on the molded components 50 and the two second sections $56_1$, $56_2$.

The support component 62 is laminated with a decorative layer 64. The decorative layer 64 may be embodied as a film which is adhesively bonded to the carrier component. Furthermore, the molded component 50 is fiber-reinforced. For this purpose, for example carbon fibers or glass fibers are embedded in the thermoplastic matrix (not shown).

The two second sections $56_1$, $56_2$ abut at a tear line 66 at which the support component 62 and the decorative layer 64 are selectively weakened, for example by means of a perforation.

The air bag guide 42 defines a guide channel 67 with an exit opening 69 for the air bag 44. When triggered, the air bag 44 strikes the two second sections $56_1$, $56_2$ of the insert 52, which are consequently rotated with respect to the first section 54 on both sides of the tear line 66 together with the support component 62 and the decorative layer 64 by approximately 90°, causing the exit opening 69 to be released and allowing the air bag 44 to enter the interior space of the motor vehicle.

In the exemplary interior trim component 10P according to the prior art shown in FIG. 1, material accumulates where the tubular projection 16 transitions into the base section 14, which can cause sink marks. However, due to the use of the foam layer 24, the sink marks are not visible from the interior space of the motor vehicle.

Compared to the interior trim component 10P illustrated in FIG. 1, the molded component 50 of the interior trim component $10_1$ according to the invention does not accumulate material, so that no sink marks can occur which would have to be covered by a correspondingly thick foam layer 24. Consequently, the support component 62 can be designed to be significantly thinner compared to the foam layer 24, so that less mass needs to be moved when the air bag 44 is triggered. The same applies to the insert 52 and in particular to the two second sections $56_1$, $56_2$. Furthermore, no lifting loop is required because the support component 62, unlike the foamed cover, does not or does only insignificantly block the movement of the two second sections $56_1$, $56_2$.

The use of a self-reinforcing thermoplastic matrix or of a self-reinforcing plastic material, at least in the region of the two second sections $56_1$, $56_2$ of the insert 52, prevents parts of the support component 62 from splintering when the air bag 44 is inflated.

The air bag guide 42 and the air bag module 46 attached thereto together form an air bag assembly 74.

FIG. 2B shows a schematic diagram of a second embodiment of the interior trim component $10_2$ according to the invention. The construction of the interior trim component $10_2$ according to the second exemplary embodiment is substantially similar to that of the trim component $10_2$ according to the first exemplary embodiment. The significant difference is that a decorative layer 64 is not applied to the support component 62.

FIGS. 3A and 3B each show in a perspective view a first and second exemplary embodiment of the molded component 50 according to the invention. The molded component 50 according to the first exemplary embodiment has a fastening section 72 with screw holes 68, with which the air bag module 46 can be fastened to the air bag guide 42 with a screw connection. For this purpose, the air bag guide 42 may have unillustrated bolts which extend through the bolt holes 68. The bolts can be integrated into the air bag guide 42 and provided with threads. In the molded component 50 according to the second exemplary embodiment the fastening section 72 includes a plurality of hooking openings 70, in which the air bag module 46 can be hooked.

FIGS. 4A to 4D show each in a perspective view different embodiments of the insert 52 according to the invention. These differ in the number of the second sections 56 and in the manner in which the air bag module 46 can be attached to the air bag guide 42.

The insert 52 in FIG. 4A has a number of bolt holes 68 arranged on the fastening section 72 which corresponds to the number of the screw holes 68 of the molded component 50 according to first exemplary embodiment shown in FIG. 3A. The fastening section 72 is rigidly connected to the first section 54. Consequently, the air bag module 46 can be fastened to the air bag guide 42 by means of a screw connection, wherein the screw connection includes both the molded component 50 and the insert 52. The insert 52 according to the first exemplary embodiment is thus connected with the first exemplary embodiment of the molded component 50 (see FIG. 3A).

Moreover, the insert 52 shown in FIG. 4A has two second sections $56_1$, $56_2$ which are hingedly attached to the first section 54 and are movable relative to the first section 54. If one follows the movable edges of the two second sections $56_1$, $56_2$, an H-shape is formed in plan view.

FIG. 4B shows a second exemplary embodiment of the insert 52 according to the invention. It can be seen that the insert 52 according to the second exemplary embodiment has, for example, a number of hooking openings 70, via which the air bag module 46 can be connected to the air bag guide 42. The second exemplary embodiment of the insert 52 is therefore connected to the second exemplary embodiment of the molded component 50 (see FIG. 3B). Moreover, the insert 52 has two second sections $56_1$, $56_2$, thus producing once more the H-shape of the movable edges described for the first exemplary embodiment.

FIG. 4C shows a third exemplary embodiment of the insert 52 according to the invention. Like the first exemplary embodiment, the insert 52 according to the third exemplary embodiment has also the screw holes 68, so that the air bag module 46 is connected to the first exemplary embodiment of the molded component 50 with a screw connection. However, the insert has only one second section 56, so that in plan view the movable edges the second section 56 form a U-shape.

FIG. 4D shows a fourth exemplary embodiment of the insert 52 according to the invention. Like the second exemplary embodiment, the insert 52 according to the fourth exemplary embodiment has the hooking openings 70, so that the air bag module 46 can be connected to the first exemplary embodiment of the molded component 50 by a hook connection. Like in the third exemplary embodiment, however, the insert member 52 has only one second section 56, so that in plan view the movable edges the second section 56 form a U-shape.

FIG. 5 shows in a basic sectional view a third exemplary embodiment of the interior trim component $10_3$ according to the present invention. The insert 52 has two second sections $56_1$, $56_2$. The air bag guide 42 is connected to the support component 62, wherein the support component 62 extends over the support surfaces reinforced with the reinforcing ribs 58 as well as over the two second sections $56_1$, $56_2$. The air bag guide 42 has the hooking openings 70, so that the air bag module 46 is fastened to the air bag guide 42 by a hook connection. For this purpose, the air bag module 46 has corresponding hooks 71. It can be seen that the hook connection allows only a relatively coarse positioning of the air bag module 46 in the guide channel 67. The actual attachment of the air bag module 46 is effected by other sections of the trim component $10_3$, in particular by the channel 67 and the insert 52.

FIG. 6 shows in a basic sectional view a fourth exemplary embodiment of the interior trim component $10_4$ according to the present invention. The insert 52 includes in this case only one second section 56. The support component 62 extends over the support surfaces 60 reinforced with the reinforcing ribs 58 as well as over the second section 56. The air bag module 46 is in this exemplary embodiment fixed in the air bag guide 42 by way of an unillustrated screw connection and uniquely secured in its position.

Figures 7A, 7B:
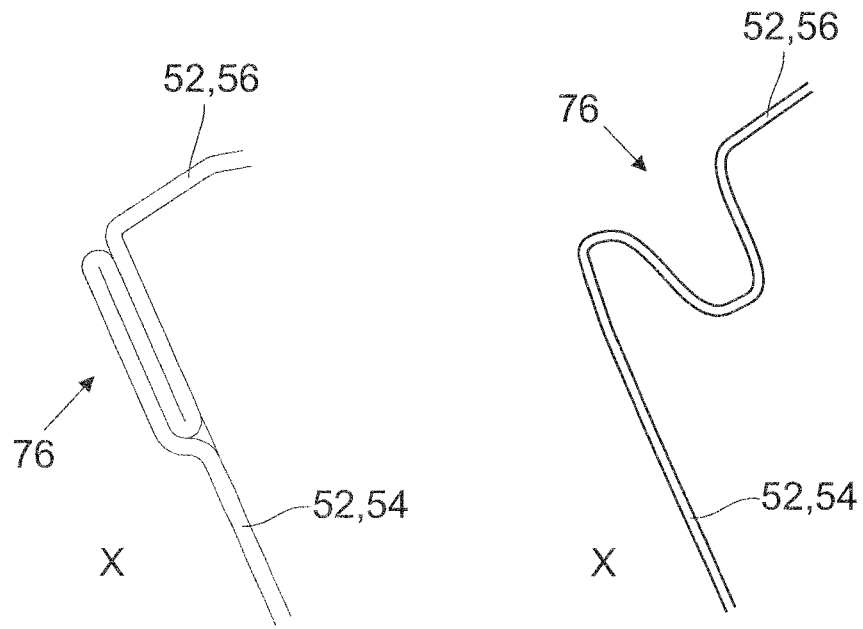

FIGS. 7A and 7B show two embodiments of the insert 52 in the area marked X in FIG. 5 on an enlarged scale. As described, in the embodiment shown in FIG. 5, the insert 52 is with the first section 54 materially connected to the molded component 50, while the two second sections $56_1$, $56_2$ are hinged on the first section 54 and thus movably connected to the first section 54. This is also the case in the embodiments shown in FIGS. 7A and 7B; however, the second section 56 forms a lifting loop 76, which is sealed in the embodiment illustrated in FIG. 7A, whereas the lifting loop 78 in FIG. 7B is open. An essential difference is that the second section 56 within the lifting loop 76 comes into contact with itself in the embodiment shown in FIG. 7A, so that the lifting loop 76 is constructed in layers, whereas the lifting loop 76 in the embodiment shown in FIG. 7B has a U-shape or a V-shape and the second section 56 do come into contact with itself.

An essential difference between the exemplary embodiments of the trim component $10_3$ and $10_4$ shown in FIGS. 5 and 6 is that the interior trim component $10_3$ according to the third exemplary embodiment has two second sections $56_1$, $56_2$, whereas the interior trim component $10_4$ according to the fourth exemplary embodiment has only one second section 56. In the third exemplary embodiment of the interior trim component $10_3$, a lifting loop 76 constructed as shown in FIG. 7A may be provided in the region X, and a lifting loop 76 constructed as shown in FIG. 7B may be provided in the region Y. However, a lifting loop 76 may not be provided at least in one of the regions X or Y. Moreover, identically constructed lifting loop 76 may be provided in both regions X, Y.

The exemplary embodiment of the interior trim component 10₄ shown in FIG. 6 has only one second section 56. In analogy of the above discussions of the third embodiment 10₃, no lifting loop or one lifting loop 76 as illustrated in FIGS. 7A and 7B may be provided in the region of the trim component 10₂ designated as region Y in FIG. 6.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An air bag guide for guiding an air bag of a motor vehicle, comprising
   a molded component defining a guide channel with an exit opening for exiting of the air bag from the guide channel,
   an insert inserted into the molded component, the insert having a first section materially connecting the first section with the molded component, and
   at least a second section hingedly connected to the first section and movable relative to the first section,
   wherein the exit opening is opened by the second section under an action of the air bag upon exiting from the guide channel, and
   wherein the molded component is from a thermoplastic material or has a thermoplastic matrix, and the insert is composed of the same thermoplastic material as the molded component or comprises the same thermoplastic matrix as the molded component, with at least the second section being of self-reinforcing thermoplastic material or thermoplastic matrix.

2. The air bag guide according to claim 1, wherein the thermoplastic is polypropylene.

3. The air bag guide according to claim 2, wherein the molded component is fiber reinforced.

4. The air bag guide according to claim 3, wherein the molded component is fiber-reinforced with glass fibers, polypropylene fibers and/or carbon fibers.

5. The air bag guide according to claim 1, wherein the molded component has reinforcing ribs.

6. The air bag guide according to claim 5, wherein the molded component and/or the insert have a number of fastening sections for attaching an air bag module.

7. The air bag guide according to claim 6, wherein the fastening sections comprise screw holes, via which the air bag module is attached to the air bag guide by way of a screw connection.

8. The air bag guide according to claim 7, wherein, the air bag module is attached to the air bag guide by bolts integrated in the air bag guide.

9. The air bag guide according to claim 6, wherein the fastening sections comprise hooking openings, by way of which the air bag module is connected to the air bag guide with a hook connection.

10. An air bag assembly for a motor vehicle, comprising
    an air bag module having an air bag and a gas generator cooperating with the air bag for inflating the air bag, and
    an air bag guide according to claim 1, wherein the air bag module is attached to the air bag guide.

11. An interior trim component for a motor vehicle, comprising
    an air bag guide according to claim 1,
    an air bag module having an air bag and a gas generator cooperating with the air bag for inflating the air bag, wherein the air bag module is attached on the air bag guide, and
    a support component which is attached on the air bag guide in the region of the exit opening.

12. An interior trim component according to claim 11, wherein the support component is injection-molded, or is injection-molded and provided with a decorative layer.

13. A method for producing an interior trim component comprising the following steps:
    injection-molding a molded component made of a thermoplastic material or of a thermoplastic matrix, wherein the molded component defines a guide channel for the air bag with an exit opening, via which the air bag can exit from the guide channel,
    injection-molding an insert inserted in the molded component and made of the same thermoplastic material or of the same thermoplastic matrix, wherein the insert has a first section with which the insertion part is materially connected with the molded part, and at least a second section, which is hingedly connected to the first section and movable relative to the first section, and the second section closes the exit opening and opens under the effect of the air bag when exiting the guide channel, wherein the thermoplastic material or the thermoplastic matrix is self-reinforcing at least in the second section, and,
    attaching a support component on the air bag guide, which is formed by the molded component and the insert, in the region of the exit opening.

14. The method of claim 13, further comprising the step of attaching to the air bag guide device an air bag module having an air bag and a gas generator cooperating with the air bag for inflating the air bag.

\* \* \* \* \*